(12) United States Patent
Lin

(10) Patent No.: US 7,360,753 B1
(45) Date of Patent: Apr. 22, 2008

(54) CABLE TIGHTENING DEVICE HAVING ANTI-THEFT FUNCTION

(76) Inventor: Chia-Sheng Lin, 114, Sec. 1, Yung Po Rd., Pun Hsin Hsiang, Changhua Hsien (TW)

( * ) Notice: Subject to any disclaimer, the term of this patent is extended or adjusted under 35 U.S.C. 154(b) by 0 days.

(21) Appl. No.: 11/645,930

(22) Filed: Dec. 27, 2006

(51) Int. Cl.
*B25B 9/00* (2006.01)
(52) U.S. Cl. ............ 254/218; 254/239; 24/70 ST; 24/69 ST; 24/71 ST
(58) Field of Classification Search ........... 254/217, 254/218, 223, 239; 24/70 ST, 69 ST, 69 CT, 24/71 ST
See application file for complete search history.

(56) References Cited

U.S. PATENT DOCUMENTS

| | | | | |
|---|---|---|---|---|
| 4,227,286 A | * | 10/1980 | Holmberg | 24/68 CD |
| 4,395,796 A | * | 8/1983 | Akaura et al. | 24/68 CD |
| 4,493,133 A | * | 1/1985 | Nilsson | 24/68 T |
| 6,457,701 B1 | * | 10/2002 | Huang | 254/217 |
| 7,100,901 B2 | * | 9/2006 | Gleinser | 254/218 |

* cited by examiner

*Primary Examiner*—Emmanuel M Marcelo
(74) *Attorney, Agent, or Firm*—Alan Kamrath; Kamrath & Associates PA

(57) ABSTRACT

A cable tightening device includes a fixed unit, a rotation member rotatably mounted on the fixed unit, a movable unit mounted on the rotation member and movable relative to the fixed unit to drive the rotation member to rotate relative to the fixed unit in a oneway direction, and a locking unit mounted between the fixed unit and the movable unit to releasably lock the movable unit onto the fixed unit. Thus, the movable unit is locked onto the fixed unit by the locking unit to lock the cable tightening device and the cable so as to protect the cargo wound by the cable, thereby achieving an anti-theft purpose.

19 Claims, 6 Drawing Sheets

CABLE TIGHTENING DEVICE HAVING ANTI-THEFT FUNCTION

BACKGROUND OF THE INVENTION

1. Field of the Invention

The present invention relates to a cable tightening device and, more particularly, to a cable tightening device for tightening or loosening a cable so as to bind or release a cargo.

2. Description of the Related Art

A conventional cable tightening device is mounted on a wheeled vehicle having a larger size, such as a truck or the like, to tighten a cable which is wound around a cargo so as to tighten the cargo. However, the conventional cable tightening device is opened easily, so that the cable is loosened easily and quickly to release the cargo, and the cargo is easily stolen.

BRIEF SUMMARY OF THE INVENTION

In accordance with the present invention, there is provided a cable tightening device, comprising a fixed unit, a rotation member rotatably mounted on the fixed unit, a movable unit mounted on the rotation member and movable relative to the fixed unit to drive the rotation member to rotate relative to the fixed unit in a oneway direction, and a locking unit mounted between the fixed unit and the movable unit to releasably lock the movable unit onto the fixed unit.

The primary objective of the present invention is to provide a cable tightening device having an anti-theft function.

Another objective of the present invention is to provide a cable tightening device, wherein the movable unit is locked onto the fixed unit by the locking unit to lock the cable tightening device and the cable so as to protect the cargo wound by the cable, thereby achieving an anti-theft purpose.

A further objective of the present invention is to provide a cable tightening device, wherein the cable tightening device is locked and unlocked easily and quickly, thereby facilitating the user locking and unlocking the cable tightening device.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
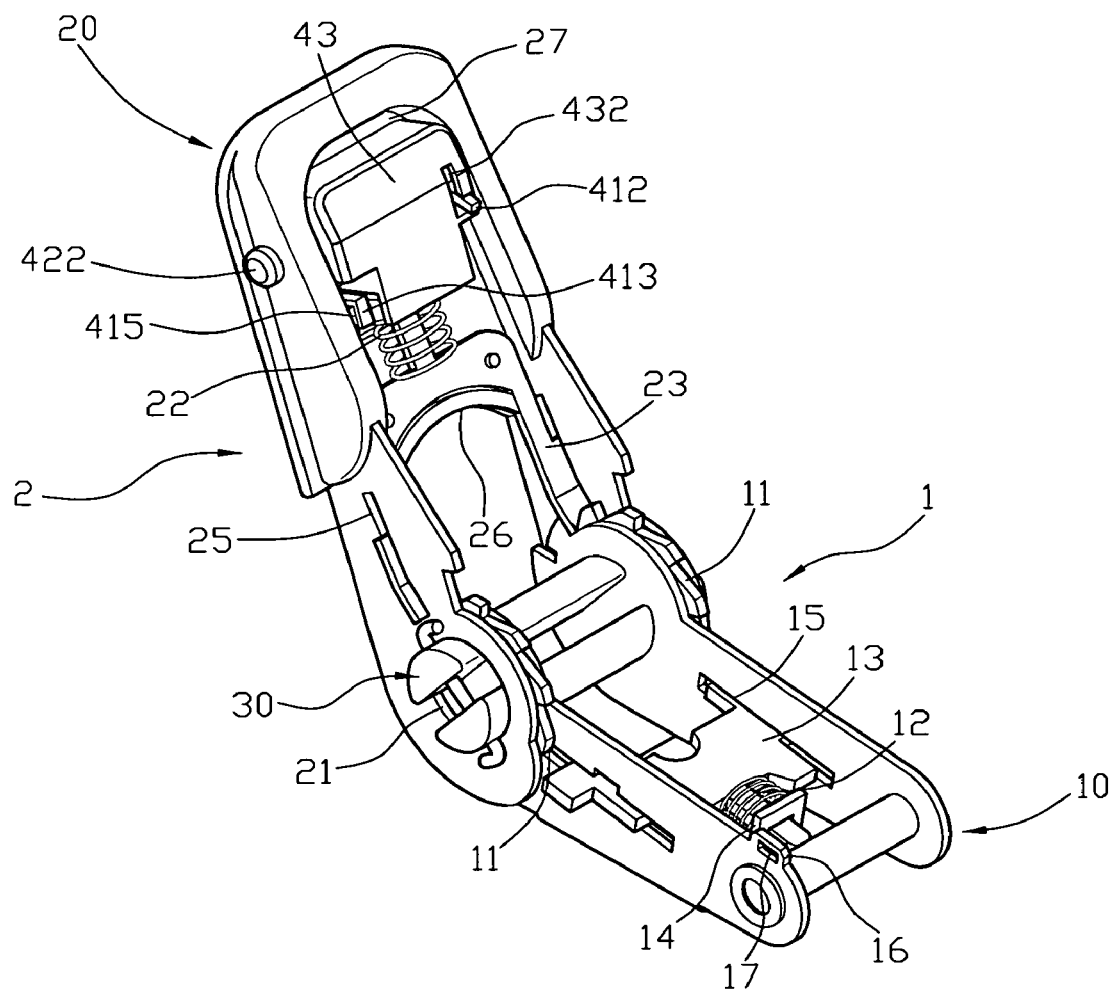
FIG. 1 is a perspective view of a cable tightening device in accordance with the preferred embodiment of the present invention.
Figure 2:
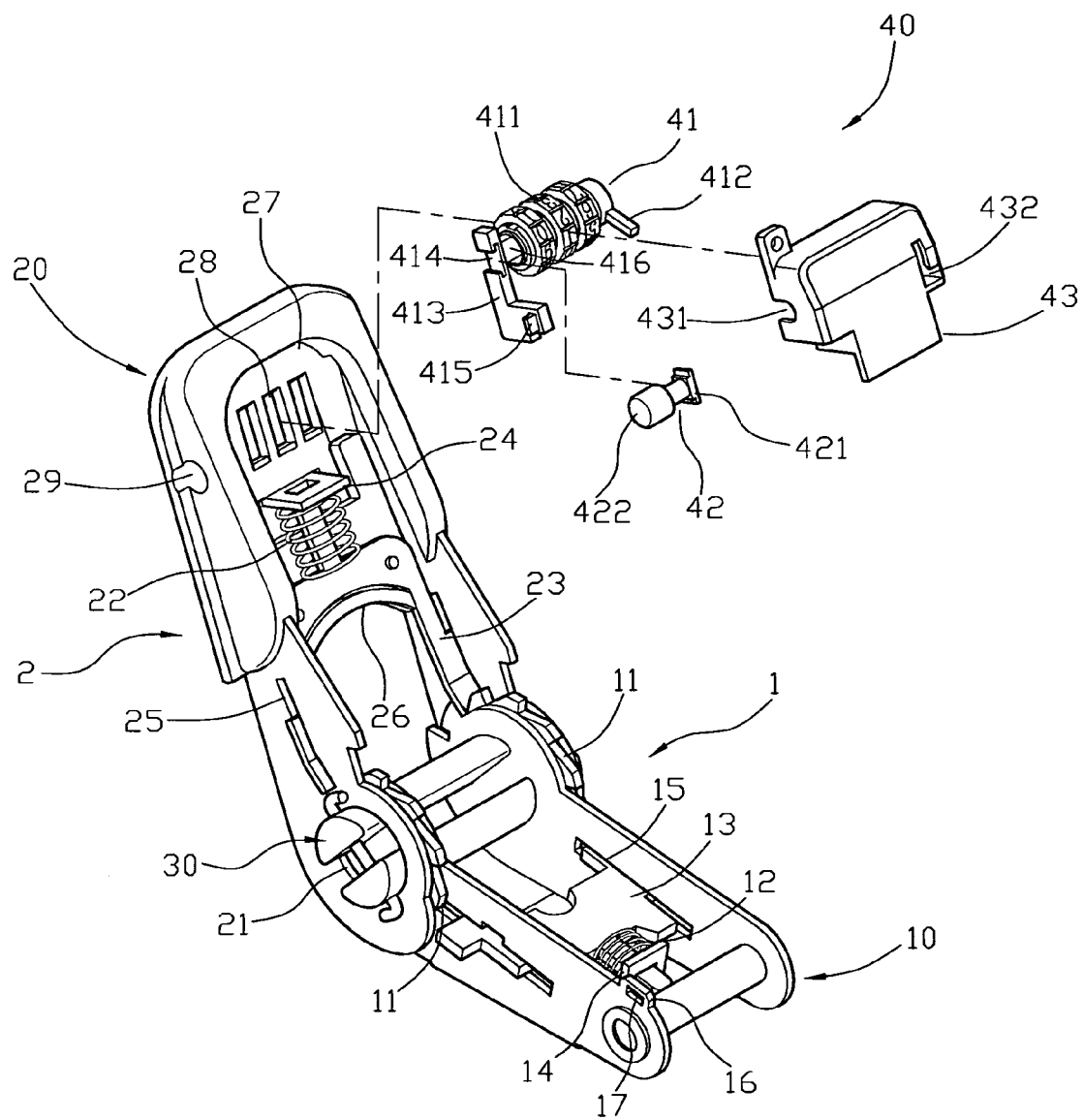
FIG. 2 is a partially exploded perspective view of the cable tightening device as shown in FIG. 1.

Referring to the drawings and initially to FIGS. 1 and 2, a cable tightening device in accordance with the preferred embodiment of the present invention comprises a fixed unit 1, a rotation member 30 rotatably mounted on the fixed unit 1, a movable unit 2 mounted on the rotation member 30 and movable relative to the fixed unit 1 to drive the rotation member 30 to rotate relative to the fixed unit 1 in a oneway direction, and a locking unit 40 mounted between the fixed unit 1 and the movable unit 2 to releasably lock the movable unit 2 onto the fixed unit 1.

The fixed unit 1 includes a base member 10 having a side formed with a protruding ear 16 formed with a locking hole 17. The fixed unit 1 further includes two opposite ratchet wheels 11 rotatably mounted on the base member 10 and secured on the rotation member 30 to rotate the rotation member 30, a stop plate 13 movably mounted on the base member 10 and releasably engaged with the ratchet wheels 11 to allow the ratchet wheels 11 to rotate in a oneway direction, a fixing seat 14 secured on the base member 10, and an elastic member 12 biased between the stop plate 13 and the fixing seat 14 to push the stop plate 13 toward the ratchet wheels 11. The base member 10 of the fixed unit 1 has two opposite sidewalls each formed with a guide tracks 15 to guide movement of the stop plate 13.

The rotation member 30 is rotatably mounted on the base member 10 of the fixed unit 1 to wind and unwind a cable (not shown) by rotation of the rotation member 30.

The movable unit 2 includes a movable member 20 rotatably mounted on the rotation member 30 and movable relative to the base member 10 of the fixed unit 1, a push plate 23 movably mounted on the movable member 20 and releasably engaged with the ratchet wheels 11 of the fixed unit 1 to push the ratchet wheels 11 to rotate in a oneway direction, a fixing seat 24 secured on the movable member 20, an elastic member 22 biased between a first side of the push plate 23 and the fixing seat 24 to push the push plate 23 toward the ratchet wheels 11 of the fixed unit 1, and a release member 26 mounted on a second side of the push plate 23 to push the push plate 23 to detach from the ratchet wheels 11 of the fixed unit 1 so that the push plate 23 of the movable unit 2 skips the ratchet wheels 11 of the fixed unit 1 when the movable member 20 of the movable unit 2 is rotatable on the rotation member 30.

The movable member 20 of the movable unit 2 has two opposite sidewalls each formed with a guide tracks 25 to guide movement of the push plate 23 and each formed with a pivot hole 21 pivotally mounted on the rotation member 30. The movable member 20 of the movable unit 2 has a first face facing the base member 10 of the fixed unit 1 and formed with a receiving chamber 27 to receive the locking unit 40. The receiving chamber 27 of the movable member 20 has a wall formed with a plurality of receiving slots 28 exposed outwardly from a second face of the movable member 20. The movable member 20 of the movable unit 2 has a sidewall formed with a receiving hole 29 connected to the receiving chamber 27.

The locking unit 40 includes a lock body 41 mounted on and partially protruded outwardly from the movable member 20 of the movable unit 2 to move with the movable member 20, a linking bar 413 mounted on the lock body 41 and provided with a locking hook 415 that is releasably locked in the locking hole 17 of the base member 10 when the movable member 20 of the movable unit 2 is rested on the base member 10 of the fixed unit 1, a press member 42 movably mounted on the movable member 20 of the movable unit 2 and rested on the linking bar 413 to press the linking bar 413 so as to detach the locking hook 415 of the linking bar 413 from the locking hole 17 of the base member 10, and a cover 43 mounted on the movable member 20 of the movable unit 2 to cover the lock body 41. The locking unit 40 further includes a spring-biased mandrel 416 (see FIG. 2) movably mounted in the lock body 41, and a plurality of number wheels 411 rotatably mounted on the lock body 41 and connected to the mandrel 416 to releasably lock the mandrel 416.

The linking bar 413 of the locking unit 40 has a substantially L-shaped profile and has a first section secured to a first end of the mandrel 416 and formed with an insertion groove 414 and a second section formed with the locking hook 415. The mandrel 416 of the locking unit 40 has a second end provided with a code adjustment member 412. The number wheels 411 of the locking unit 40 are partially protruded outwardly from the receiving slots 28 of the movable member 20 and rotatable between a locked position where the mandrel 416 is locked by the number wheels 411 so that the linking bar 413 is fixed by the mandrel 416 to fix the locking hook 415, and an unlocked position where the mandrel 416 is unlocked from the number wheels 411 so that the linking bar 413 is movable with the mandrel 416 to move the locking hook 415.

The press member 42 of the locking unit 40 is movably mounted in the receiving hole 29 of the movable member 20 and has a first end formed with a push button 422 protruded outwardly from the receiving hole 29 of the movable member 20 and a second end extended into the receiving chamber 27 of the movable member 20 and formed with a push block 421 inserted into the insertion groove 414 of the linking bar 413.

The cover 43 of the locking unit 40 is mounted in the receiving chamber 27 of the movable member 20 to seal the receiving chamber 27 of the movable member 20 and has a first end formed with an opening 431 to allow passage of the mandrel 416 of the locking unit 40 and a second end formed with a breach 432 to allow passage of the code adjustment member 412 of the locking unit 40.

Figure 3:
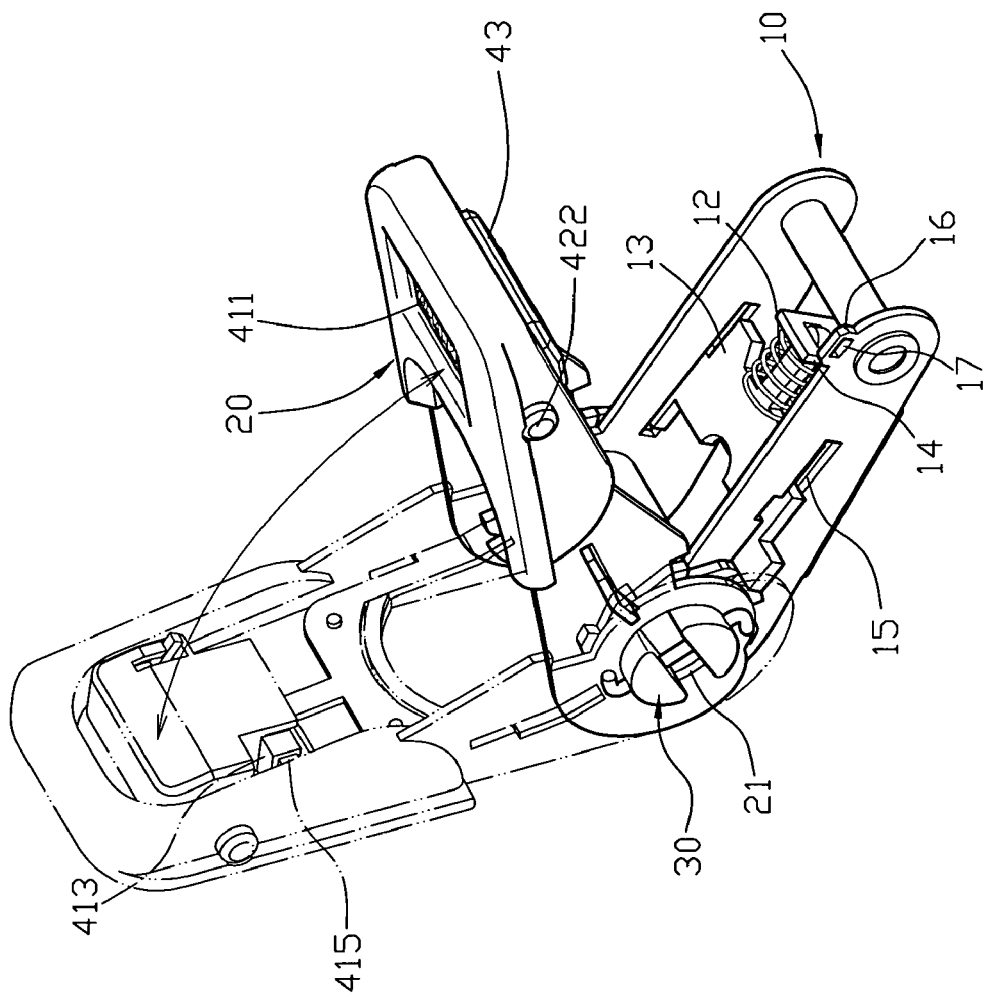
FIG. 3 is a schematic operational view of the cable tightening device as shown in FIG. 1.

As shown in FIGS. 1-3, when the movable member 20 of the movable unit 2 is pivoted outwardly relative to the base member 10 of the fixed unit 1, the push plate 23 of the movable unit 2 is moved with the movable member 20 to rotate the ratchet wheels 11 which rotates the rotation member 30. On the contrary, when the movable member 20 of the movable unit 2 is pivoted toward the base member 10 of the fixed unit 1, the push plate 23 of the movable unit 2 passes by the ratchet wheels 11 so that the rotation member 30 is not rotated. Thus, when the movable member 20 of the movable unit 2 is pivoted relative to the base member 10 of the fixed unit 1 in a reciprocal manner, the push plate 23 of the movable unit 2 is moved with the movable member 20 to push the ratchet wheels 11 to rotate in a oneway direction so that the rotation member 30 is rotated successively in a oneway direction to wind the cable so as to tighten a cargo.

Figure 4:
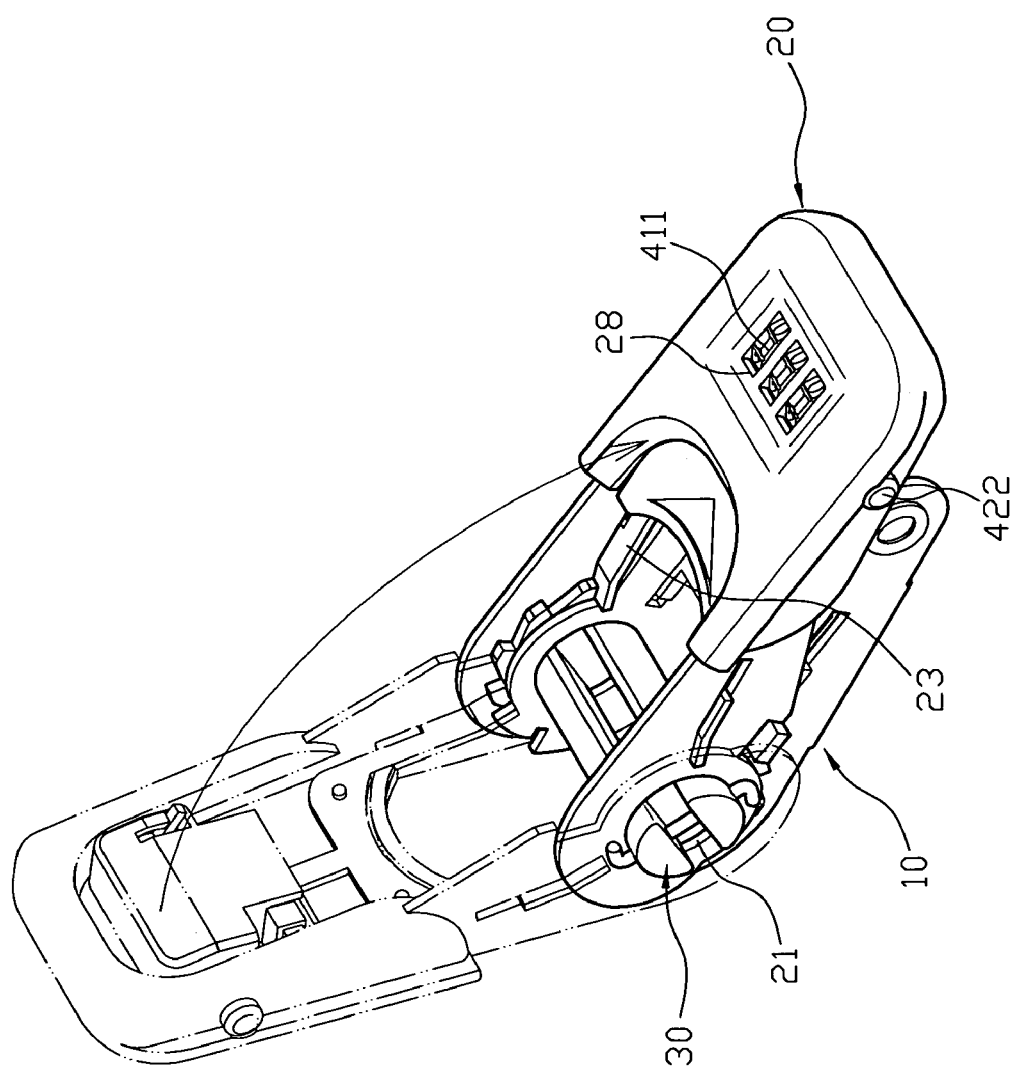
FIG. 4 is a schematic operational view of the cable tightening device as shown in FIG. 1.

As shown in FIGS. 1 and 4, when the cable tightening device is not in use, the release member 26 of the movable unit 2 is pressed upwardly to push the push plate 23 of the movable unit 2 outwardly relative to the ratchet wheels 11 of the fixed unit 1 to detach the push plate 23 of the movable unit 2 from the ratchet wheels 11 of the fixed unit 1 so that the push plate 23 of the movable unit 2 skips the ratchet wheels 11 of the fixed unit 1 when the movable member 20 of the movable unit 2 is rotatable on the rotation member 30. Thus, the movable member 20 of the movable unit 2 is pivoted freely relative to the base member 10 of the fixed unit 1 as shown in FIG. 4.

Figure 5:
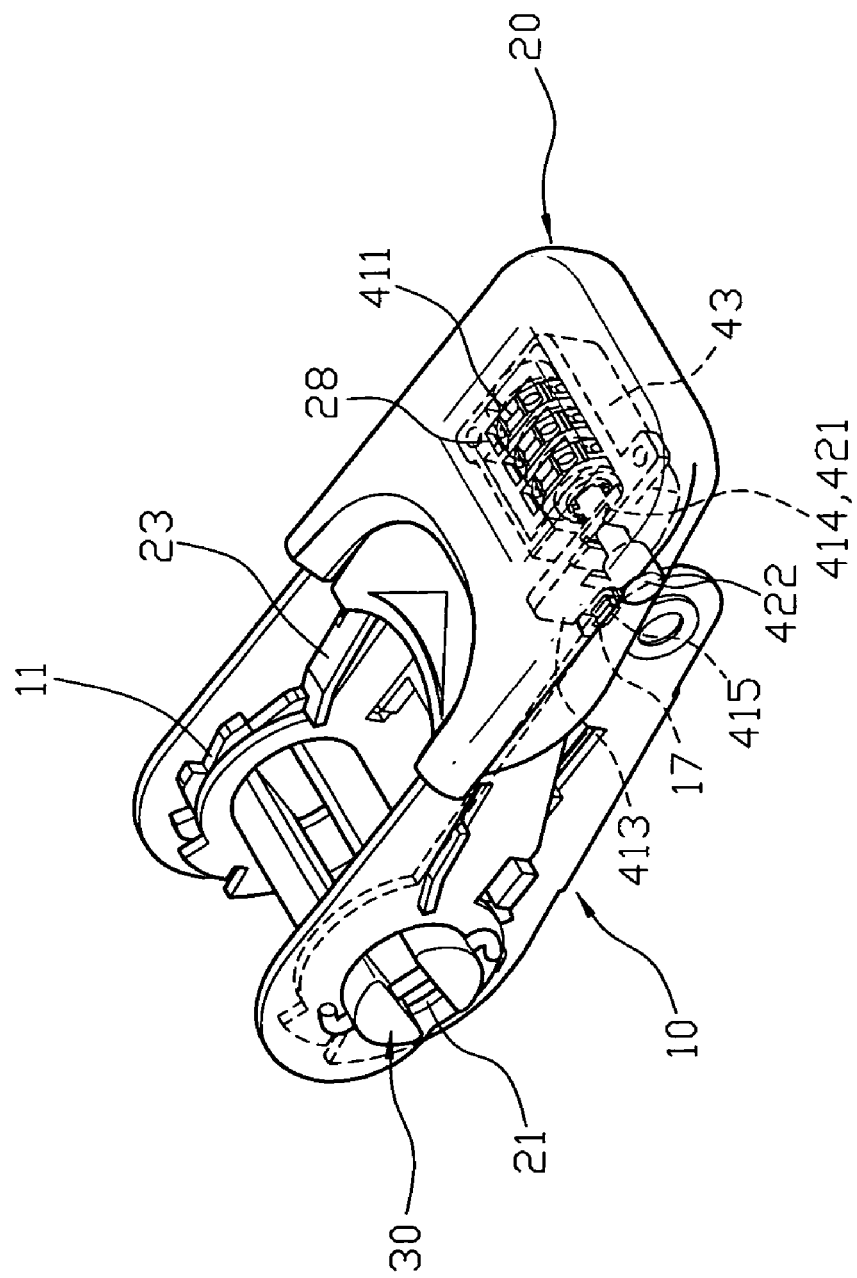
FIG. 5 is a schematic operational view of the cable tightening device as shown in FIG. 1.

As shown in FIGS. 1 and 5, when the movable member 20 of the movable unit 2 is rested on the base member 10 of the fixed unit 1 as shown in FIG. 5, the locking hook 415 of the linking bar 413 is inserted into and locked in the locking hole 17 of the base member 10. Then, the number wheels 411 of the locking unit 40 are rotated to the locked position where the mandrel 416 is locked by the number wheels 411 so that the linking bar 413 is fixed by the mandrel 416 to fix the locking hook 415, thereby locking the movable member 20 of the movable unit 2 onto the base member 10 of the fixed unit 1, and thereby locking the cable tightening device so as to protect the cargo wound by the cable.

Figure 6:
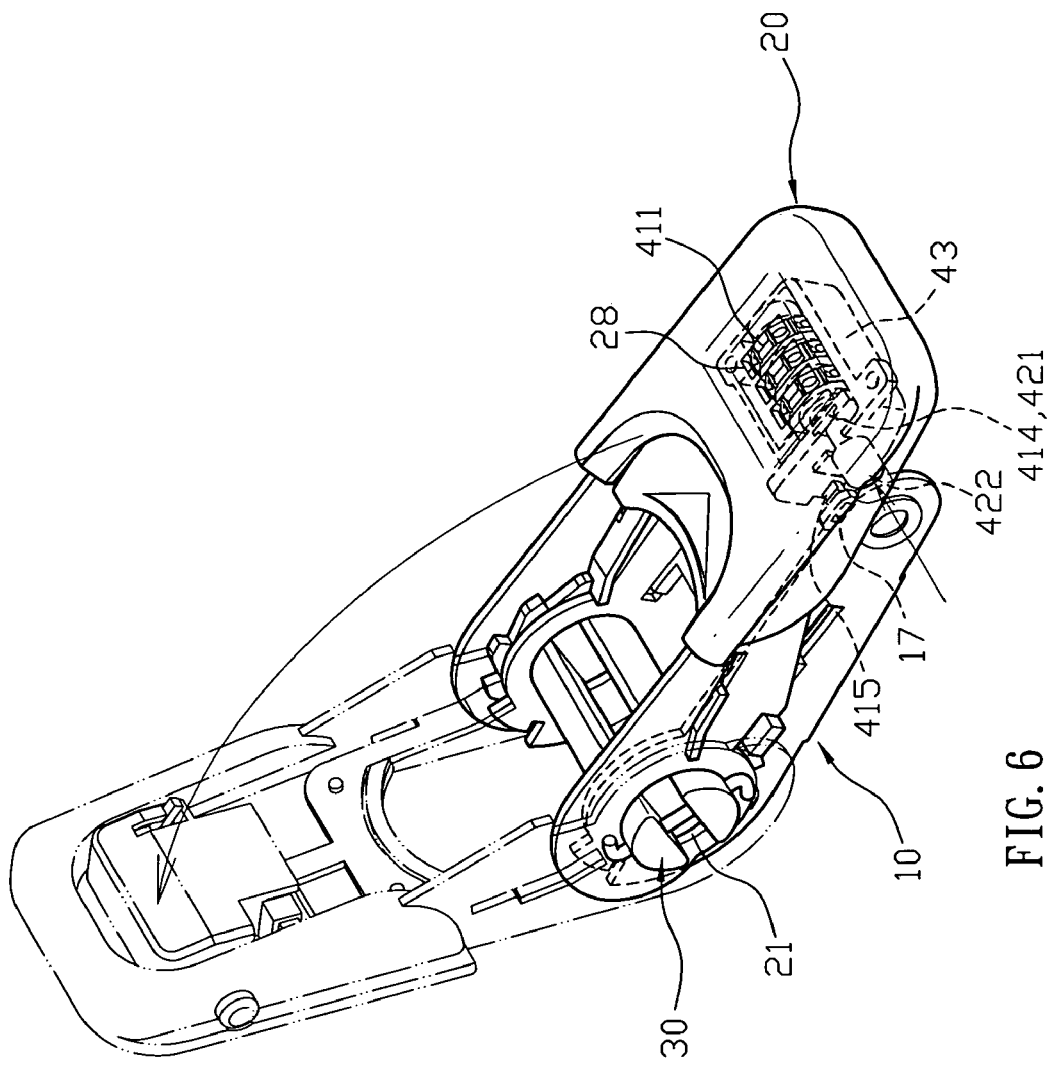
FIG. 6 is a schematic operational view of the cable tightening device as shown in FIG. 5.

As shown in FIGS. 1 and 6, when the user wishes to unlock the cable tightening device, the number wheels 411 of the locking unit 40 are rotated to the unlocked position where the mandrel 416 is unlocked from the number wheels 411 so that the linking bar 413 is movable with the mandrel 416 to move the locking hook 415. Then, the push button 422 of the press member 42 is pressed inwardly to move the linking bar 413 outwardly relative to the locking hole 17 of the base member 10 so as to detach the locking hook 415 of the linking bar 413 from the locking hole 17 of the base member 10, thereby unlocking the movable member 20 of the movable unit 2 from the base member 10 of the fixed unit 1. Thus, the movable member 20 of the movable unit 2 is pivoted freely relative to the base member 10 of the fixed unit 1 as shown in FIG. 6.

Accordingly, the movable unit 2 is locked onto the fixed unit 1 by the locking unit 40 to lock the cable tightening device and the cable so as to protect the cargo wound by the cable, thereby achieving an anti-theft purpose. In addition, the cable tightening device is locked and unlocked easily and quickly, thereby facilitating the user locking and unlocking the cable tightening device.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A cable tightening device, comprising:
a fixed unit;
a rotation member rotatably mounted on the fixed unit;
a movable unit mounted on the rotation member and movable relative to the fixed unit to drive the rotation member to rotate relative to the fixed unit in a oneway direction;
a locking unit mounted between the fixed unit and the movable unit to releasably lock the movable unit onto the fixed unit; wherein:
the fixed unit includes a base member having a side formed with a protruding ear formed with a locking hole;
the movable unit includes a movable member rotatably mounted on the rotation member and movable relative to the base member of the fixed unit;
the locking unit includes a lock body mounted on and partially protruded outwardly from the movable member of the movable unit to move with the movable member, a linking bar mounted on the lock body and provided with a locking hook that is releasably locked in the locking hole of the base member when the movable member of the movable unit is rested on the base member of the fixed unit, and a press member movably mounted on the movable member of the movable unit and rested on the linking bar to press the linking bar so as to detach the locking hook of the linking bar from the locking hole of the base member.

2. The cable tightening device in accordance with claim 1, wherein the linking bar of the locking unit has a substantially L-shaped profile.

3. The cable tightening device in accordance with claim 1, wherein:
the locking unit further includes a spring-biased mandrel movably mounted in the lock body, and a plurality of number wheels rotatably mounted on the lock body and connected to the mandrel to releasably lock the mandrel;
the linking bar of the locking unit has a first section secured to a first end of the mandrel and a second section formed with the locking hook.

4. The cable tightening device in accordance with claim 3, wherein:
the movable member of the movable unit has a first face facing the base member of the fixed unit and formed with a receiving chamber to receive the locking unit;
the movable member of the movable unit has a sidewall formed with a receiving hole connected to the receiving chamber;
the first section of the linking bar is formed with an insertion groove;
the press member of the locking unit has a first end formed with a push button protruded outwardly from the receiving hole of the movable member and a second end extended into the receiving chamber of the movable member and formed with a push block inserted into the insertion groove of the linking bar.

5. The cable tightening device in accordance with claim 4, wherein:
the receiving chamber of the movable member has a wall formed with a plurality of receiving slots exposed outwardly from a second face of the movable member;
the number wheels of the locking unit are partially protruded outwardly from the receiving slots of the movable member.

6. The cable tightening device in accordance with claim 4, wherein the press member of the locking unit is movably mounted in the receiving hole of the movable member.

7. The cable tightening device in accordance with claim 4, wherein the locking unit further includes a cover mounted on the movable member of the movable unit to cover the lock body.

8. The cable tightening device in accordance with claim 7, wherein the cover of the locking unit is mounted in the receiving chamber of the movable member to seal the receiving chamber of the movable member.

9. The cable tightening device in accordance with claim 7, wherein the cover of the locking unit has a first end formed with an opening to allow passage of the mandrel of the locking unit.

10. The cable tightening device in accordance with claim 9, wherein the mandrel of the locking unit has a second end provided with a code adjustment member, and the cover of the locking unit has a second end formed with a breach to allow passage of the code adjustment member of the locking unit.

11. The cable tightening device in accordance with claim 4, wherein the push button of the press member is pressed inwardly to move the linking bar outwardly relative to the locking hole of the base member to detach the locking hook of the linking bar from the locking hole of the base member to unlock the movable member of the movable unit from the base member of the fixed unit.

12. The cable tightening device in accordance with claim 3, wherein the number wheels of the locking unit are rotatable between a locked position where the mandrel is locked by the number wheels so that the linking bar is fixed by the mandrel to fix the locking hook, and an unlocked position where the mandrel is unlocked from the number wheels so that the linking bar is movable with the mandrel to move the locking hook.

13. The cable tightening device in accordance with claim 1, wherein the fixed unit further includes two opposite ratchet wheels rotatably mounted on the base member and secured on the rotation member to rotate the rotation member, a stop plate movably mounted on the base member and releasably engaged with the ratchet wheels to allow the ratchet wheels to rotate in a oneway direction, a fixing seat secured on the base member, and an elastic member biased between the stop plate and the fixing seat to push the stop plate toward the ratchet wheels.

14. The cable tightening device in accordance with claim 13, wherein the base member of the fixed unit has two opposite sidewalls each formed with a guide tracks to guide movement of the stop plate.

15. The cable tightening device in accordance with claim 13, wherein the movable unit further includes a push plate movably mounted on the movable member and releasably engaged with the ratchet wheels of the fixed unit to push the ratchet wheels to rotate in a oneway direction, a fixing seat secured on the movable member, an elastic member biased between a first side of the push plate and the fixing seat to push the push plate toward the ratchet wheels of the fixed unit, and a release member mounted on a second side of the push plate to push the push plate to detach from the ratchet wheels of the fixed unit so that the push plate of the movable unit skips the ratchet wheels of the fixed unit when the movable member of the movable unit is rotatable on the rotation member.

16. The cable tightening device in accordance with claim 15, wherein the release member of the movable unit is pressed upwardly to push the push plate of the movable unit outwardly relative to the ratchet wheels of the fixed unit to detach the push plate of the movable unit from the ratchet wheels of the fixed unit so that the push plate of the movable unit skips the ratchet wheels of the fixed unit when the movable member of the movable unit is rotatable on the rotation member.

17. The cable tightening device in accordance with claim 15, wherein the movable member of the movable unit has two opposite sidewalls each formed with a guide tracks to guide movement of the push plate.

18. The cable tightening device in accordance with claim 1, wherein the rotation member is rotatably mounted on the base member of the fixed unit.

19. The cable tightening device in accordance with claim 1, wherein the movable member of the movable unit has two opposite sidewalls each formed with a pivot hole pivotally mounted on the rotation member.

* * * * *